(12) United States Patent
Keller

(10) Patent No.: US 10,538,927 B1
(45) Date of Patent: Jan. 21, 2020

(54) CONSTRUCTION TEMPLATE WITH LASER TARGET DEVICE AND METHOD OF USE

(71) Applicant: David M. Keller, Bradenton, FL (US)

(72) Inventor: David M. Keller, Bradenton, FL (US)

( * ) Notice: Subject to any disclaimer, the term of this patent is extended or adjusted under 35 U.S.C. 154(b) by 116 days.

(21) Appl. No.: 15/468,909

(22) Filed: Mar. 24, 2017

Related U.S. Application Data

(60) Provisional application No. 62/313,255, filed on Mar. 25, 2016.

(51) Int. Cl.
*E04G 21/18* (2006.01)
*G01C 15/00* (2006.01)
*E04F 21/00* (2006.01)

(52) U.S. Cl.
CPC .............. *E04G 21/18* (2013.01); *E04F 21/00* (2013.01); *G01C 15/004* (2013.01)

(58) Field of Classification Search
CPC .......................... G01C 15/004; G01C 15/105
USPC ............................................................. 33/228
See application file for complete search history.

(56) References Cited

U.S. PATENT DOCUMENTS

| | | | |
|---|---|---|---|
| 4,744,664 A * | 5/1988 | Offt .................... | B25J 19/021 348/94 |
| 5,388,318 A | 2/1995 | Petta | |
| 6,360,448 B1 | 3/2002 | Smyj | |
| 6,901,673 B1 * | 6/2005 | Cobb .................... | G01B 21/045 33/227 |
| 7,003,890 B2 * | 2/2006 | Kavounas .......... | E04F 21/1844 33/286 |
| 7,363,720 B2 | 4/2008 | DiGavero et al. | |
| 7,373,731 B2 | 5/2008 | Nyberg | |
| 7,545,517 B2 | 6/2009 | Rueb et al. | |
| 7,555,843 B2 | 7/2009 | Leonard | |
| 8,087,179 B1 * | 1/2012 | Gomez .................. | G09B 29/00 33/1 G |
| 8,533,927 B2 * | 9/2013 | Atherton ................. | E04F 21/04 29/464 |
| 8,904,657 B1 * | 12/2014 | Kittrell .................. | G01C 15/02 33/1 G |
| 8,991,062 B2 * | 3/2015 | Atkinson ............... | G01B 11/26 33/263 |
| 2004/0078990 A1 * | 4/2004 | Boys .................... | B25H 1/0078 33/528 |
| 2005/0217129 A1 * | 10/2005 | Boys ....................... | H02G 3/00 33/528 |
| 2008/0055554 A1 * | 3/2008 | Tubin ..................... | G03B 21/26 353/30 |
| 2009/0277031 A1 * | 11/2009 | Stocking ............. | E04G 21/1841 33/562 |
| 2013/0074350 A1 * | 3/2013 | Le Mer ..................... | B63B 9/00 33/228 |
| 2016/0134860 A1 * | 5/2016 | Jovanovic ............... | G06T 17/05 348/50 |

* cited by examiner

*Primary Examiner* — Yaritza Guadalupe-McCall
(74) *Attorney, Agent, or Firm* — McDonnell Boehnen Hulbert & Berghoff LLP

(57) ABSTRACT

A construction template system includes a first template configured to removably secure to a structure, the first template having: a marker configured to mark a location for construction on the structure; and a first laser target and a second laser target; an alignment laser configured to emit a plurality of beams directed to predetermined locations.

4 Claims, 7 Drawing Sheets

US 10,538,927 B1

CONSTRUCTION TEMPLATE WITH LASER TARGET DEVICE AND METHOD OF USE

BACKGROUND

Field of the Invention

The present invention relates generally to construction template systems, and more specifically, to a partial template system for locating select items during construction.

Description of Related Art

Templates for residential and commercial building constructions are well known in the art and are effective means to map the location for the construction materials, e.g., an outlet, HVAC conduit, switches, and the like. In FIG. 1, a conventional process 101 includes adhering a plurality of templates 103 to a surface 105 of a building slab 107. In the illustrative embodiment, the plurality of templates includes three or more rolls 109, 111, and 113 that overlap each other and are rolled on top of the surface 105.

Although effective in most uses, the process 101 has significant disadvantages. For example, the rolling process does not work well when one or more structures 115 rigidly attach to and extend from surface 105. It should be understood that bathroom, kitchen and other room piping, wiring, and the like could extend from surface 105, which in turn makes the process 101 difficult, if not impossible, to achieve. Further, the process 101 is time consuming, which results in added costs for labor. In addition, the process 101 requires the use of a large amount of paper for each roll, which also results in added costs for the project. Further, utilizing large rolls of templates requires expensive printing machines that are not portable, which results in added costs for the project.

Accordingly, although great strides have been made in the area of construction template processes, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
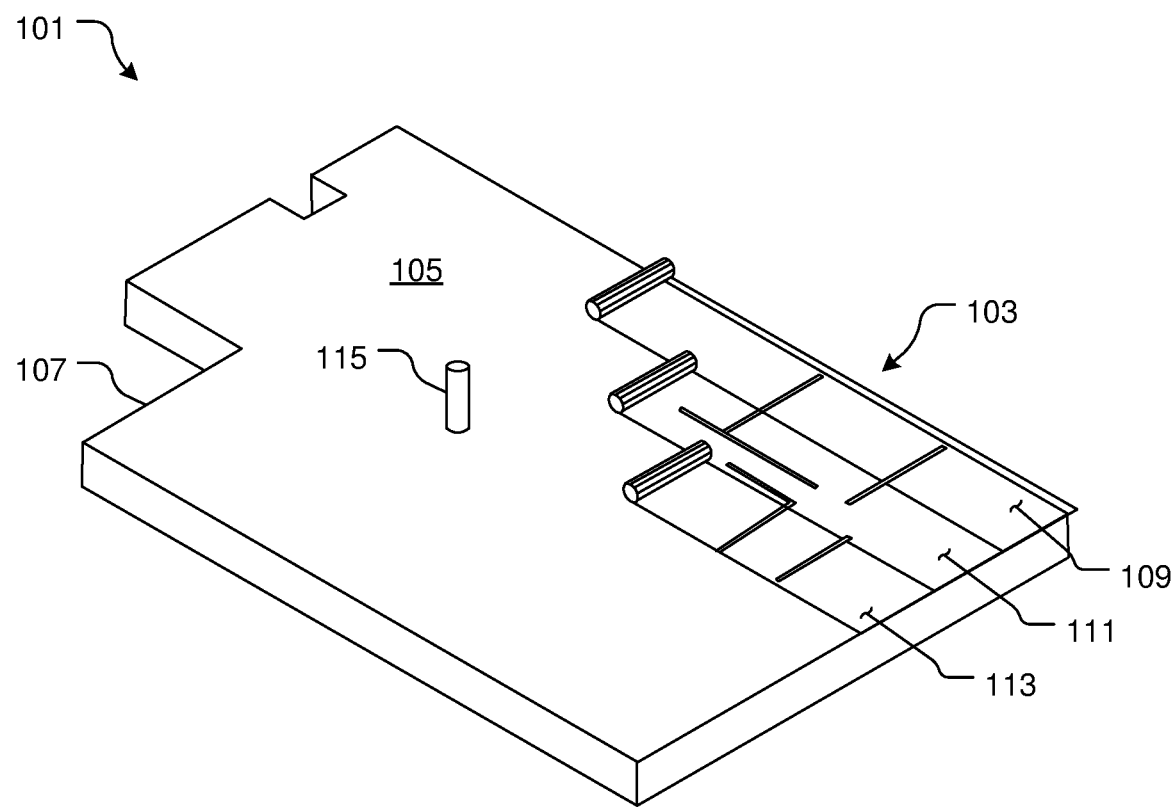
FIG. 1 is an oblique view of a conventional construction template process.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional construction template systems. Specifically, the features in the system of the present application are located with the assistance of parts of the construction accommodating the variabilities of the construction process. The system is not time consuming and provides significant savings when utilized. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
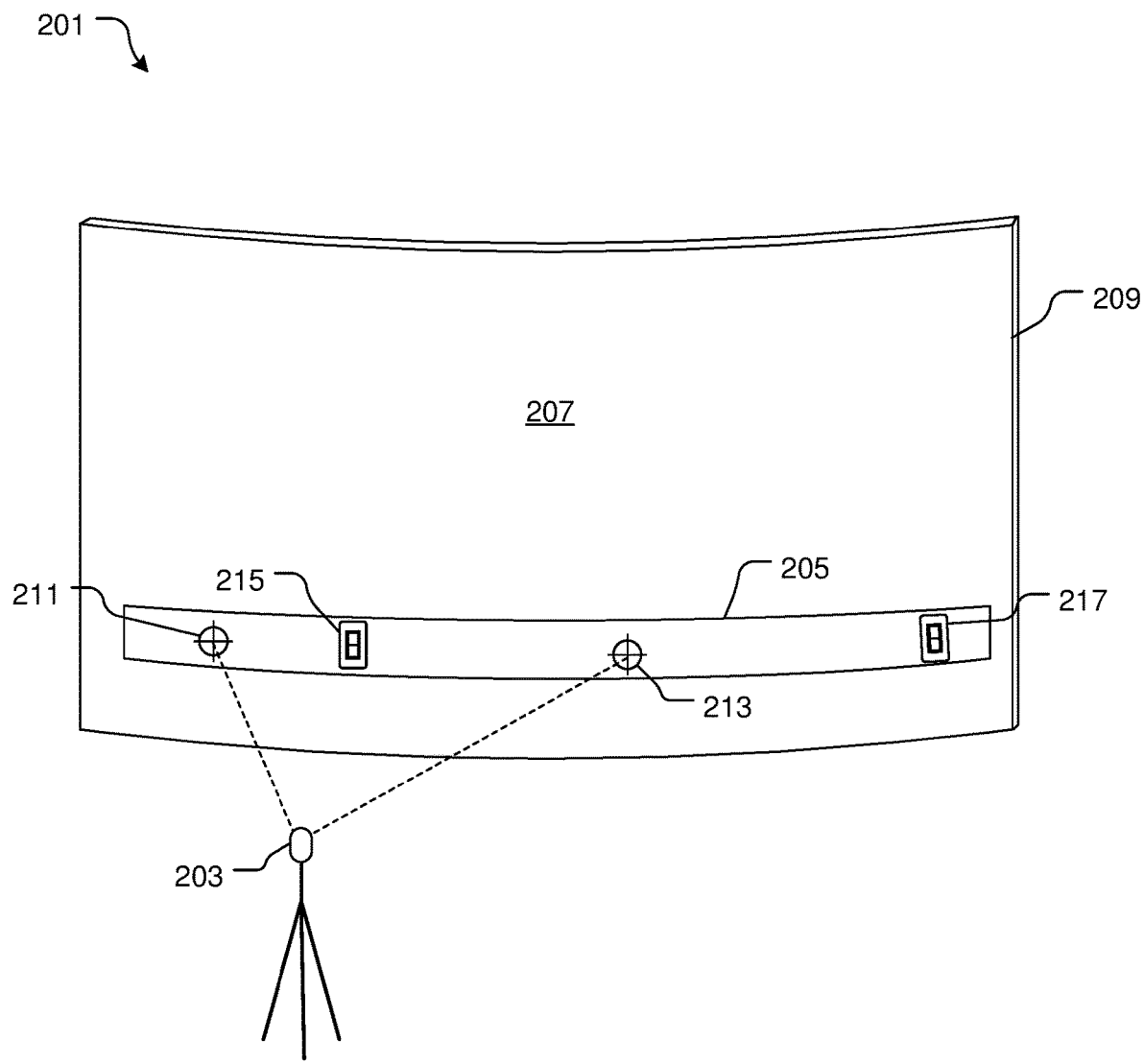
FIG. 2 is an oblique view of a template system in accordance with a preferred embodiment of the present application.

Referring now to the drawings wherein like reference characters identify corresponding or similar elements throughout the several views, FIG. 2 depicts an oblique view of the system 201 in accordance a preferred embodiment of the present application. It will be appreciated that system 201 overcomes one or more of the above-listed problems commonly associated with conventional construction template systems.

In the contemplated embodiment, system 201 includes one or more of a laser 203, configured to identify locations wherein the elongated template 205 is adhered to the surface 207 of wall 209. To achieve this feature, template 205 is provided with two or more targets 211, 213 that when illuminated indicate the exact orientation placement of the template 205. As shown, the template 205 includes one or more markings 215, 217 wherein a wall socket, switch, light, door, window, stud, electrical, HVAC components, and the like are to be placed on or within the wall 209 along with on the floor surface. During use, the worker will calibrate laser 203 and adhere the template 205 to the surface 207 after the laser 203 illuminates targets 211, 213.

Accordingly, one of the unique features believed characteristic of the present application is the use of a laser 203 with a plurality of targets 211, 213 associated with template 205 for aligning and placement of the template on the supporting structure. Further, it will be appreciated that another unique feature is the use of a single template strip of material to identify multiple locations for construction. These features greatly reduce the field labor associated with manual layout of multiple templates and costs associated with the overall costs of the construction project.

In one embodiment, the laser 203 is utilized to first mark the locations wherein the targets are to be placed, then the worker manually marks the locations and places the template thereon the marks by aligning the targets with the marks. This feature allows the worker to make location marks throughout the work area and subsequently adhere the templates on the marks; a process that greatly reduces time and costs.

In yet another embodiment, it is contemplated having a portable printer taken to the worksite, wherein the portable printer is capable of printing the templated in-situ. This feature reduces the costs of travel and provides the workers the ability to print onsite in lieu of traveling to the place of business.

It will be appreciated that laser 203 is a smart laser capable of being preprogrammed with the target locations and capable of projecting one or more beams of light along one or more planes. These features enable the worker to locate and mark various locations simultaneously prior to adhering the templated to the target locations.

It should be understood that the target locations are typically located on the edge of the template so that the worker can align the target with the marking placed on the wall and/or floor. The targets are typically given a numbering system which in turn allows the worker to install the templates in sequence to optimize installation speed.

Figure 3:
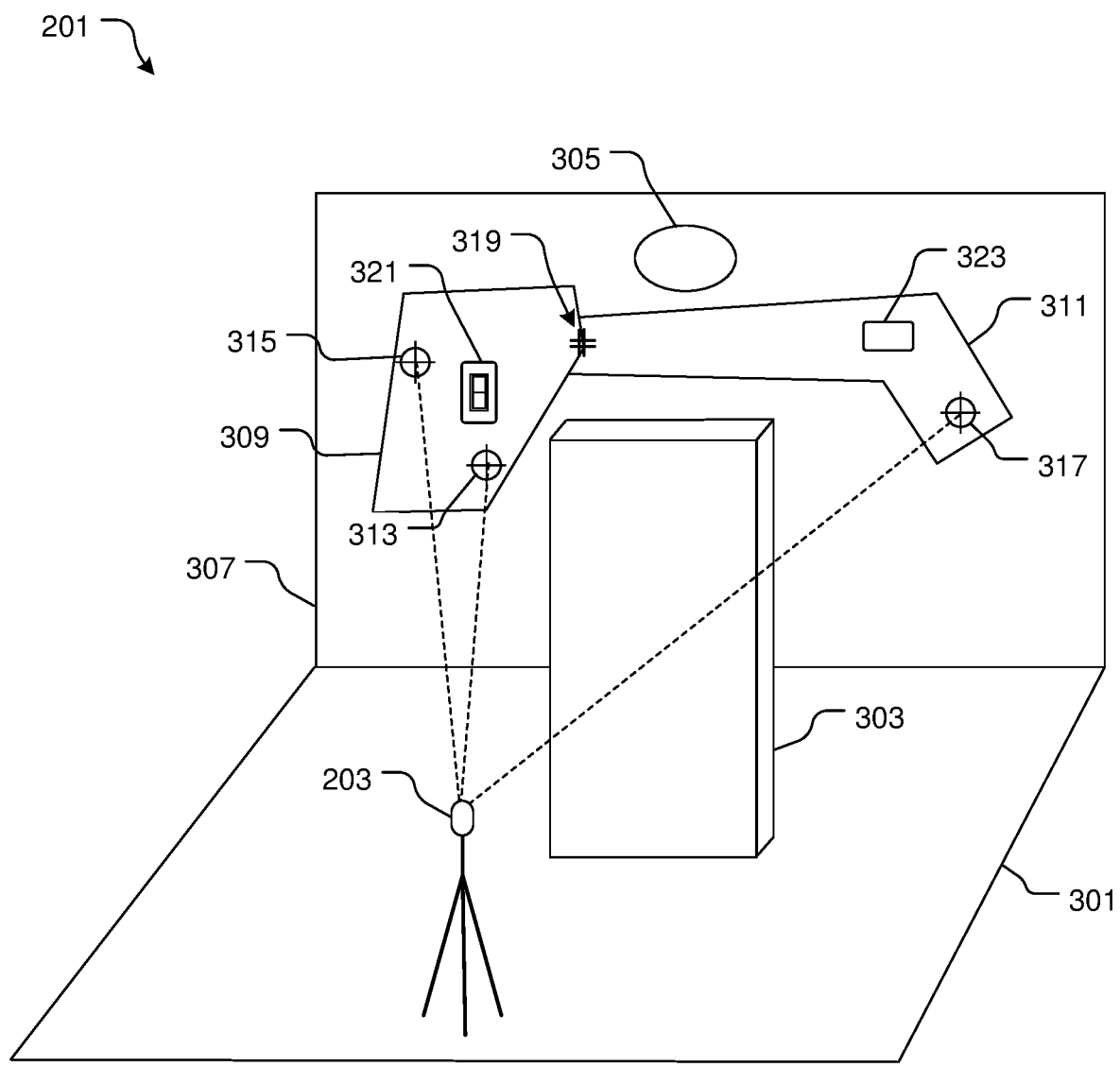
FIGS. 3-6 are oblique views of a template system in accordance with alternative embodiments of the present application.

In FIG. 3, an alternative embodiment of system 201 is shown. It should be understood that the system could utilize two or more templates joined together to achieve the desired results of identifying one or more locations for manufacture. In the exemplary embodiment, laser 203 is stationary on floor 301 and a first obstacle 303 extends from floor 301 and partially blocks the beam of light from laser 203. A second obstacle 305 is positioned on wall 307 and restricts placement of the templates.

To maneuver around the obstacles 303, 305 for identifying locations for manufacture, it is contemplated utilizing two templates 309, 311 on wall 307 that are oriented in position via targets 313, 315, and 317 along with using an alignment marking 319 partially printed on each template. After the targets are illuminated by laser 203 and the marking 319 is aligned, the locations for manufacturing, e.g., locations 321, 323 are placed in the correct position.

Figure 4:
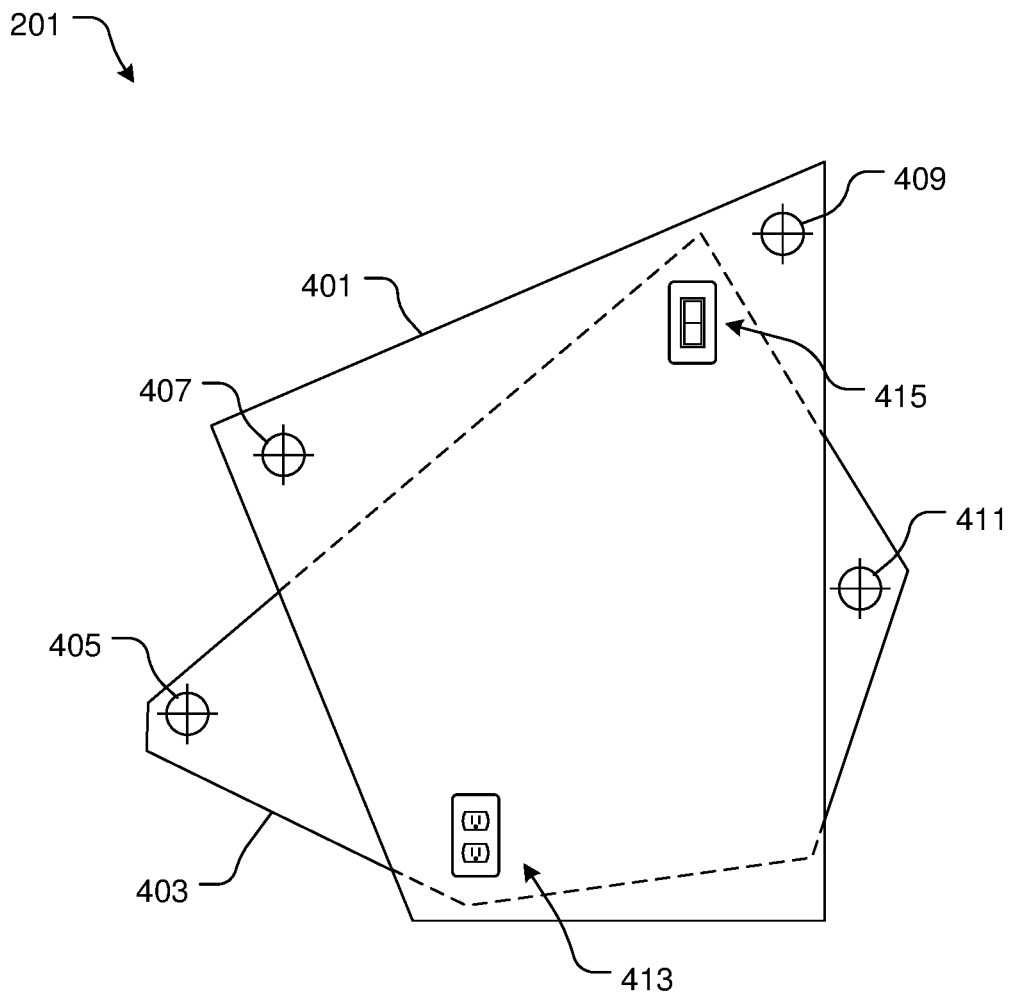

In FIG. 4, an alternative embodiment of system 201 illustrates the feature of securing two or more templates 401, 403 on top of each other. The embodiment includes the features of utilizing a plurality of targets 405, 407, 409, and 411 for aligning the templates relative to each other and for identifying the locations for manufacture, e.g., locations 413, 415. These features allow the worker to remove template 401 from 403 after use.

Figure 5:
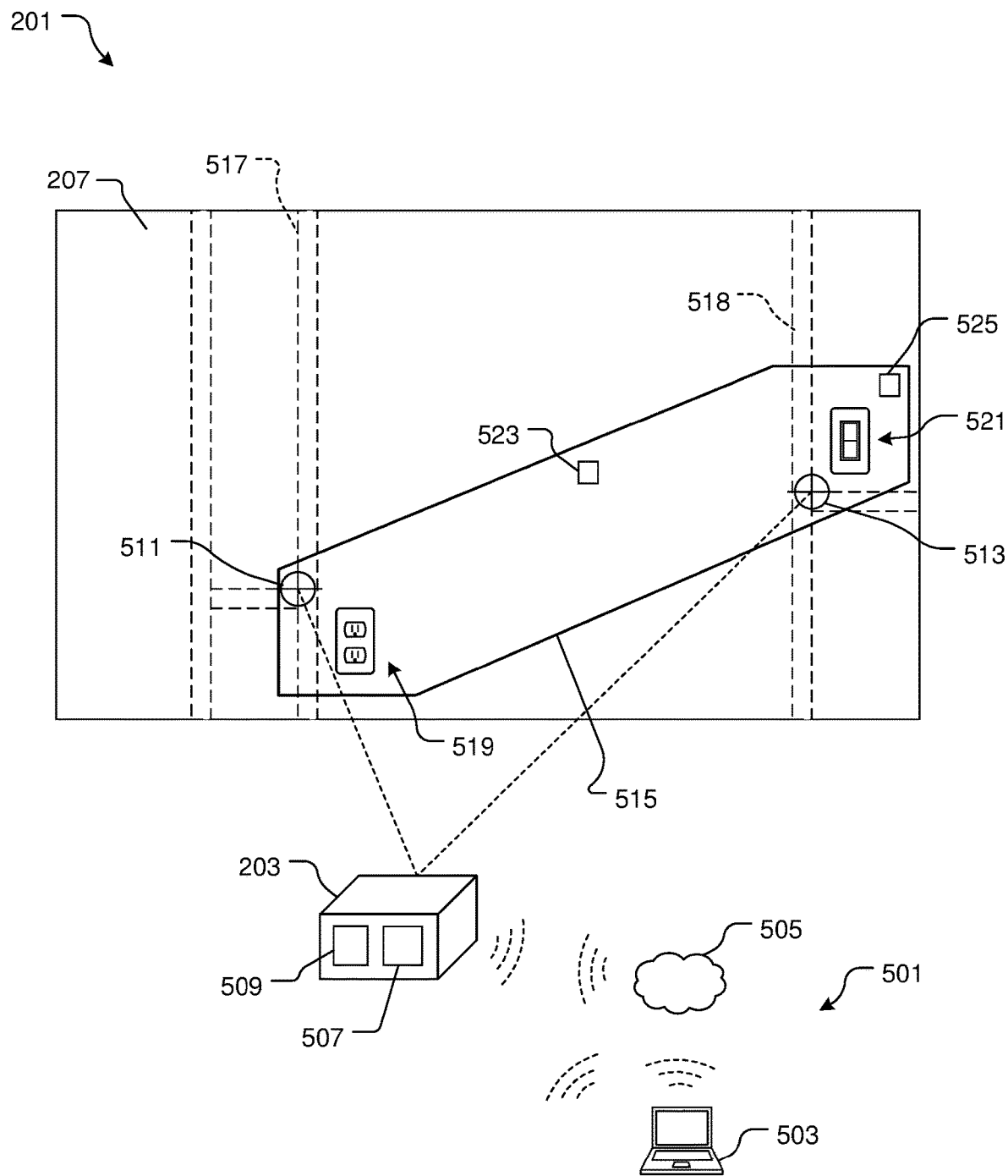

In FIG. 5, an alternative embodiment of system 201 illustrates a communication assembly 501 operably associated with laser 203. The assembly 501 includes a computer 503 in communication directly with a receiver 507 of laser 203 and/or through a server 505. During use, the data to be transmitted to laser 203 could be stored within a database 509 carried by or in communication with laser 203.

The system 201 could be adapted to identify locations such as studs 517, 518 disposed within the wall and the targets 511, 513 relative to the locations. It will be appreciated that the template 515 could also include cutouts 523, 525 that can easily be removed during the manufacturing process along with the location markers 519, 521.

Figure 6:
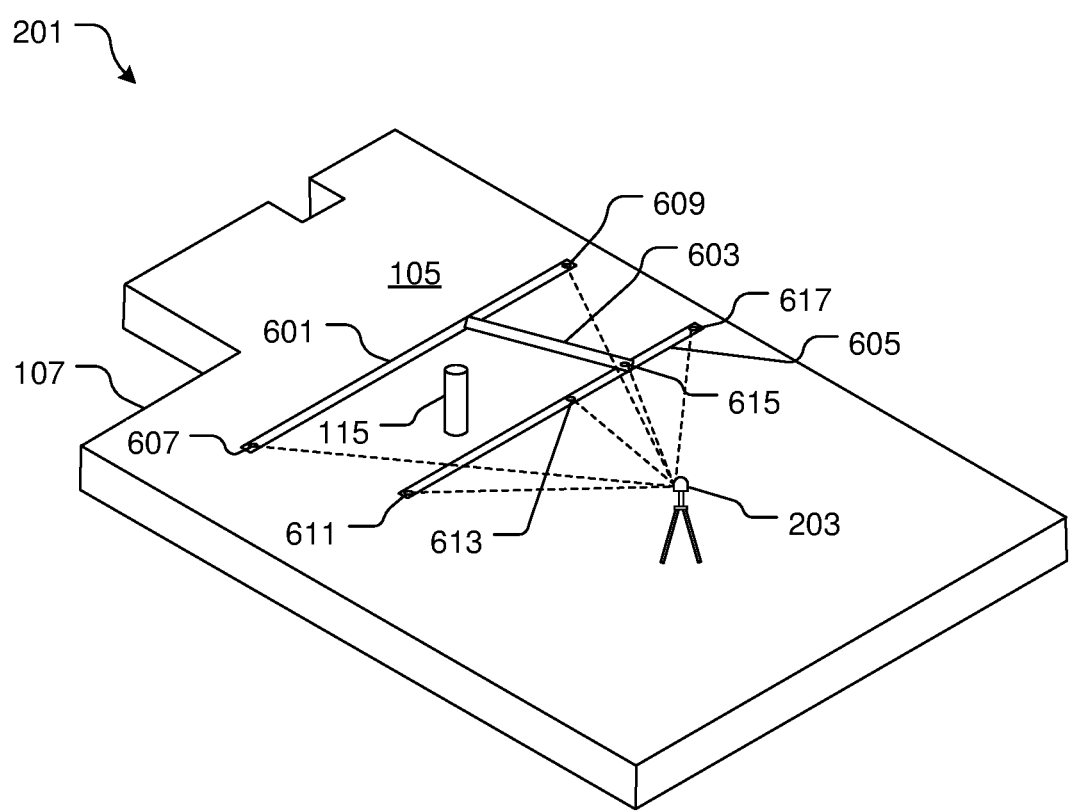

As shown in FIG. 6, the system 201 could also be utilized with the floor 107. In the exemplary embodiment, the laser 203 is operably associated with three templates 601, 603, and 605 by illuminated targets 607, 609, 611, 613, 615, and 617. Accordingly, it will be appreciated that a plurality of templates could be utilized on the walls and/or floor of the building for manufacture.

Figure 7:
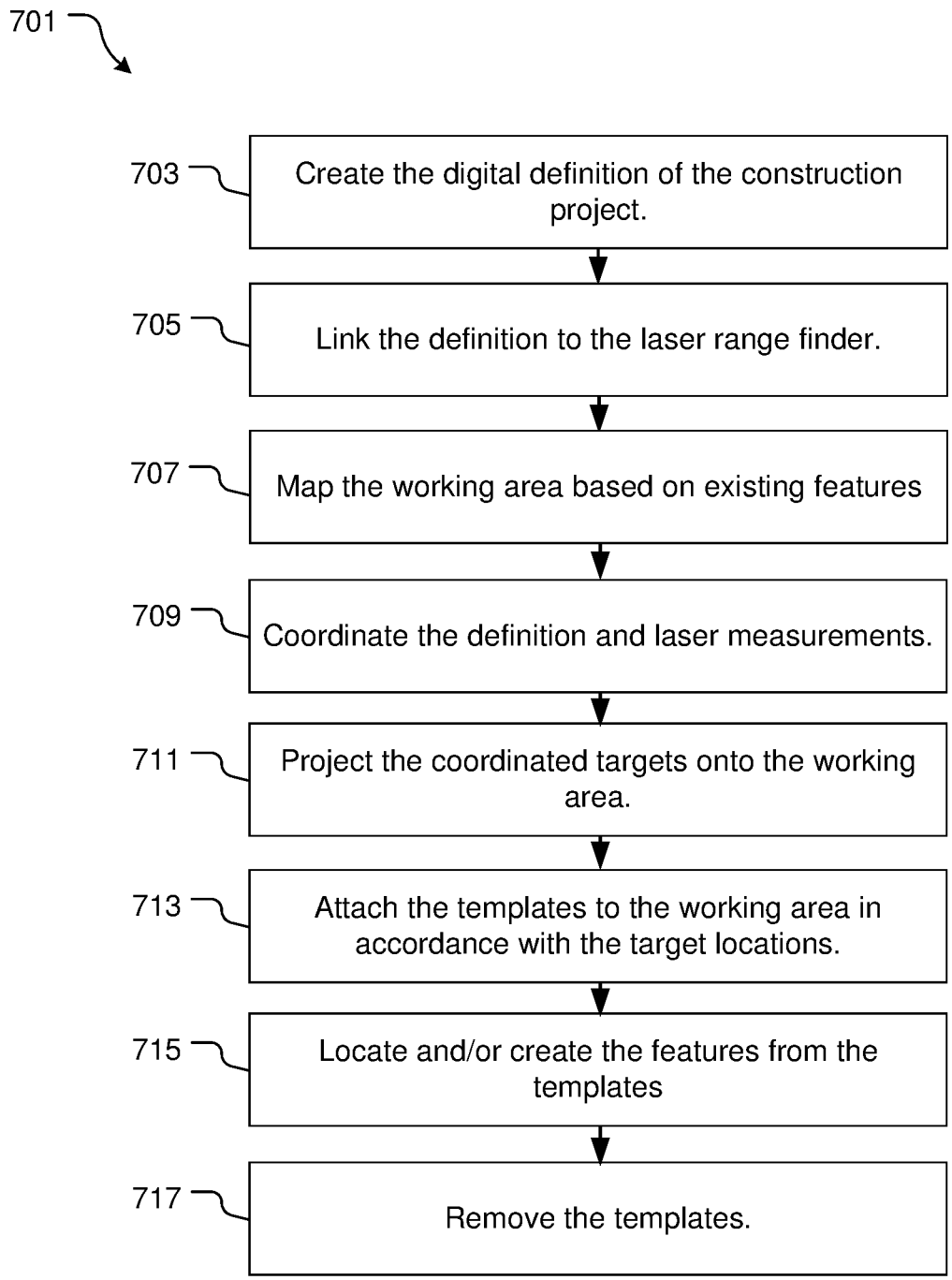
FIG. 7 is a simplified flowchart depicting the preferred method of use.

Referring now to FIG. 7, a flowchart 701 depicts the preferred method of use, which includes creating a digital definition of the construction project 703, linking the digital definition to laser range finder 705, mapping the working area from existing features 707, coordinate the digital definition to the laser measurements 709, projecting coordinated targets onto the working area 711, attaching templates to the area 713, locating/creating features on from the templates 715, removing templates 717.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A construction template system, comprising:
    a first template couplable to a structure, wherein the first template comprises:
        a marker configured to mark a location for construction on the structure;
        a cutout removably attached to the first template, the cutout being configured to mark a second location for construction; and
        a first laser target and a second laser target; and
    an alignment laser configured to emit a first beam and a second beam directed to predetermined locations on the structure, wherein the first beam illuminates a first predetermined location on the structure and the second beam illuminates a second predetermined location on the structure;
    wherein the first laser target of the template is aligned to the first predetermined location and the second laser target of the template is aligned to the second predetermined location such that the marker is located at the location for construction when the first template is coupled to the structure.

2. The system of claim 1, wherein the first template further comprises a first alignment marker, the system further comprising:

a second template couplable to the structure, wherein the second template comprises:
   a second marker configured to mark a second location for construction on the structure; and
   a second alignment marker configured to align with the first alignment marker.
3. The system of claim 1, further comprising:
a computer system in data communication with the laser and configured to direct the plurality of beams to the predetermined locations; and
a secondary computer configured to communication with the computer system.
4. The system of claim 1, wherein the structure is a floor.

\* \* \* \* \*